United States Patent
Wu et al.

(10) Patent No.: US 7,493,837 B2
(45) Date of Patent: Feb. 24, 2009

(54) PARTITION ROOM AND SPACER BALL FOR BALL SCREW UNIT

(75) Inventors: Wen-Chia Wu, Taichung (TW); Yuh-Siang Lin, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 636 days.

(21) Appl. No.: 11/211,672

(22) Filed: Aug. 26, 2005

(65) Prior Publication Data

US 2007/0068300 A1   Mar. 29, 2007

(51) Int. Cl.
 *F16H 1/24*   (2006.01)
(52) U.S. Cl. ............ 74/424.88; 384/520; 384/522
(58) Field of Classification Search .............. 74/424.71, 74/424.82, 424.88; 384/51, 52, 520, 521, 384/522, 552
See application file for complete search history.

(56) References Cited

U.S. PATENT DOCUMENTS 785,663 A * 3/1905 Chapman .................. 384/521
3,208,806 A * 9/1965 Grolmann et al. ........... 384/520

FOREIGN PATENT DOCUMENTS

JP    2003247619 A  *  9/2003
JP    2004346963 A  *  12/2004

* cited by examiner

*Primary Examiner*—Richard W L Ridley
*Assistant Examiner*—Phillip Johnson
(74) *Attorney, Agent, or Firm*—Rosenberg, Klein & Lee

(57) ABSTRACT

A ball screw unit has a plurality of partition-rooms each of them accommodating a spacer ball interposed between two load carrying balls. The partition room is formed into two oblique frustum shaped recesses each of them extends a flared mouth tilted downwards to the longitudinal axis of the ball screw unit. The partition room is made of elastic polymer material to facilitate pushing the spacer ball into an oblate ellipsoidal hole opened on the partition room, and the hole is also communicated with the two recesses. With this structure, the spacer balls can be held stably in the partition rooms without the fear of escaping or occurrence of disorganized ball squeezing during operation of the ball screw unit. Besides, the dimension of spacer ball may be made as small as possible so as to increase the number of load carrying balls thereby resulting in improvement of load carrying capability of the structure.

3 Claims, 3 Drawing Sheets

PARTITION ROOM AND SPACER BALL FOR BALL SCREW UNIT

BACKGROUND OF THE INVENTION

1. Field of the Invention

The present invention related to partition room and spacer ball for ball screw unit, and more particularly, to a partition room in which a spacer ball is interposed between the load carrying balls in a ball screw unit for assisting the load carrying balls to roll smoothly. Each spacer ball is confined in a specially prepared partition room and is in rotational contact with its adjacent load carrying balls at both sides, while the spacer ball is made smaller than the load carrying ball so as to increase the number of load carrying capability by smoothing the rolling of the load carrying balls.

2. Description of the Prior Art

In an ordinary ball screw unit, the mechanical operation is smoothed with reduced friction contributed by balls interposed between the bolt and nut. The structure contains a plurality of load carrying balls which being in contact with both bolt and nut, and spacer balls which being smaller than the load carrying balls are interposed between the load carrying balls. The spacer balls, which are non-load carrying are contacted load carrying balls at both sides so as to cause the two adjacent load carrying balls to rotate in the same direction thereby facilitating the ball screw unit to operate smoothly.

Meanwhile, in a ball screw unit equipped with spacer balls, if the spacer balls are made two large, the number of load carrying balls has to be reduced which results in lowering the load carrying capability of the ball screw unit, both statically and kinetically. On the other hand, if the spacer balls are made too small, the connected line of centers of successive pitch circles will be distorted to cause mutual squeezing of balls that leads to a rugged movement of the ball screw unit.

For rectifying the above shortcomings, there are some manufacturers employ a polymer partition room to separate the adjacent load carrying balls, and a spacer ball made smaller in size than the load carrying ball is confined therein to rotatably in contact with the load carrying balls at both sides. With such arrangement, the aforesaid problematic phenomenon of mutual squeezing of balls seems to have been solved. But actually, as the spacer ball is practically difficult to appropriately settle in the partition room so as to let it rotate smoothly in there, which in turn, degrades the function of the load carrying balls.

For these defects noticeable on the prior art, an improvement is seriously required.

The inventor of the present invention has plunged into this matter for years to studying and improving these defects and come up with a structure of partition room and spacer balls for ball screw unit as provided in this invention to eliminate the defects mentioned above.

SUMMARY OF THE INVENTION

Accordingly, the main object of the present invention is to provide a dexterously designed structure of partition room and spacer ball, which can reduce the size of the spacer balls and increase the number of load carrying balls without affecting the smoothness of rolling of the load carrying balls so as to improve function of the ball screw unit.

Another object of the present invention is to facilitate filling the spacer ball into the partition room and appropriately settle it in the position so as to keep effective rotational contact with the adjacent load carrying balls.

Still another object of the present invention is to well confine the spacer balls in the partition room without letting them escape.

To achieve these and other objects mentioned above, the present invention provides a plurality of polymer partition rooms each formed into two oblique frustum recesses to couple with the spherical surfaces of the load carrying balls. The distance between the vertexes of the two recesses is slightly less than the diameter of the spacer ball. A hole communicating with the two recesses is opened on the partition room with its center aligned to the center of the line connecting the vertexes of the two recesses for filling the spacer ball into it. The filling hole is configurated into approximately an oblate ellipsoid with its major axis slightly longer than the diameter of the spacer ball, while the minor axis thereof slightly shorter. With this structure each spacer ball can be pushed into its own position by the resiliency of the partition material without the worry of accidental bouncing out during operation of the ball screw unit, but instead, it can well maintain an intermediate contact with the loading balls at both sides so as to assist their smooth rolling.

BRIEF DESCRIPTION OF THE DRAWINGS

The drawings disclose an illustrative embodiment of the present invention, which serves to exemplify the various advantages and objects hereof, and are as follows.

DETAILED DESCRIPTION OF THE PREFERRED EMBODIMENT

Figure 1:
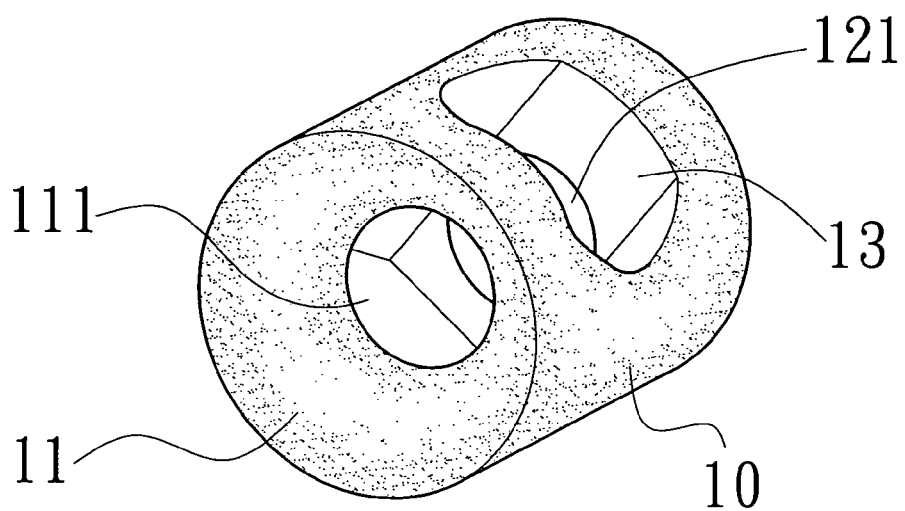
FIG. 1 is a structural schematic view of a partition room according to the present invention.
Figure 2:
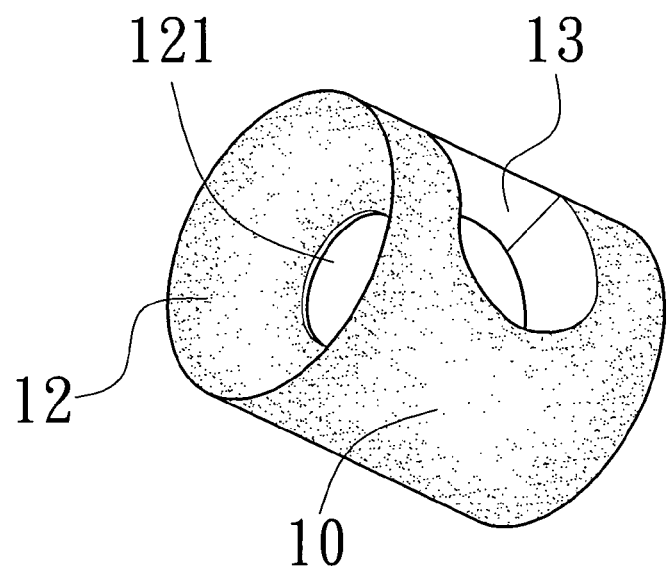
FIG. 2 is a structural schematic view of a partition room of FIG. 1 observed from another direction.
Figure 3:
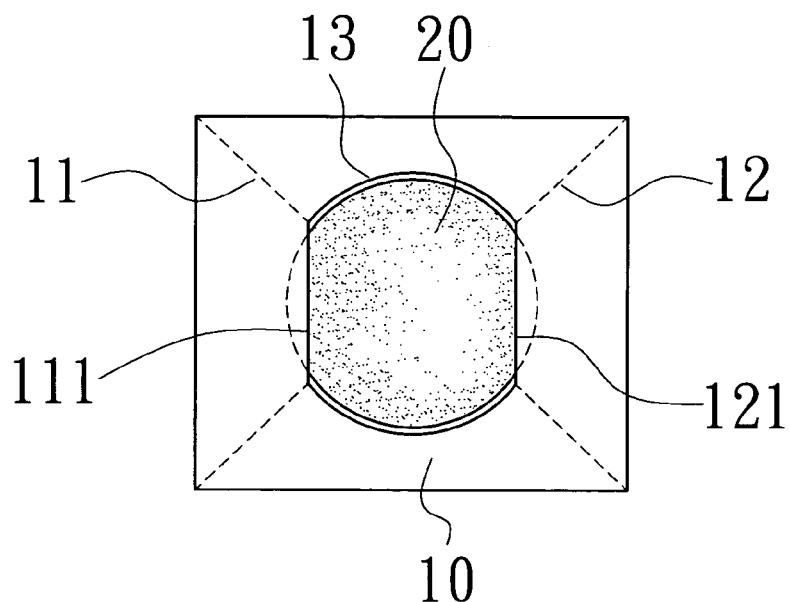
FIG. 3 is a top view of the partition room containing a spacer ball.
Figure 4:
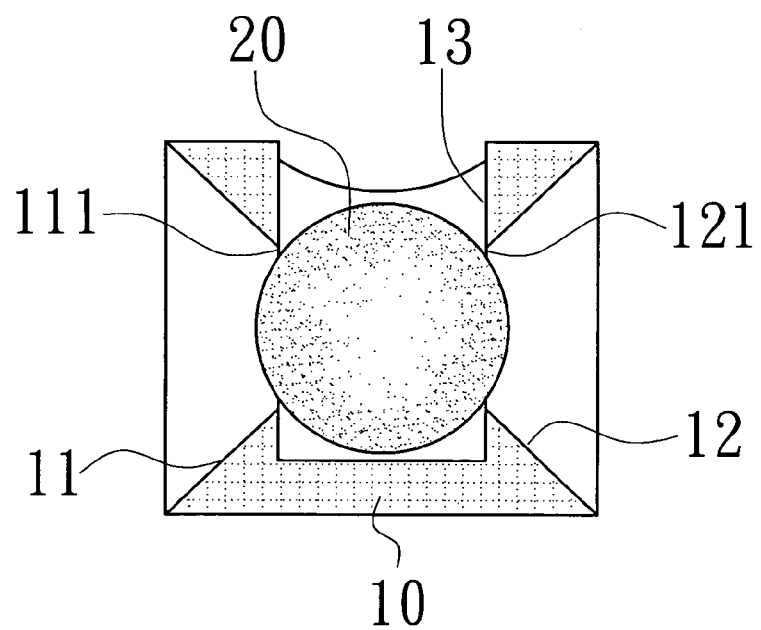
FIG. 4 is a side view of the partition room containing a spacer ball.
Figure 5:
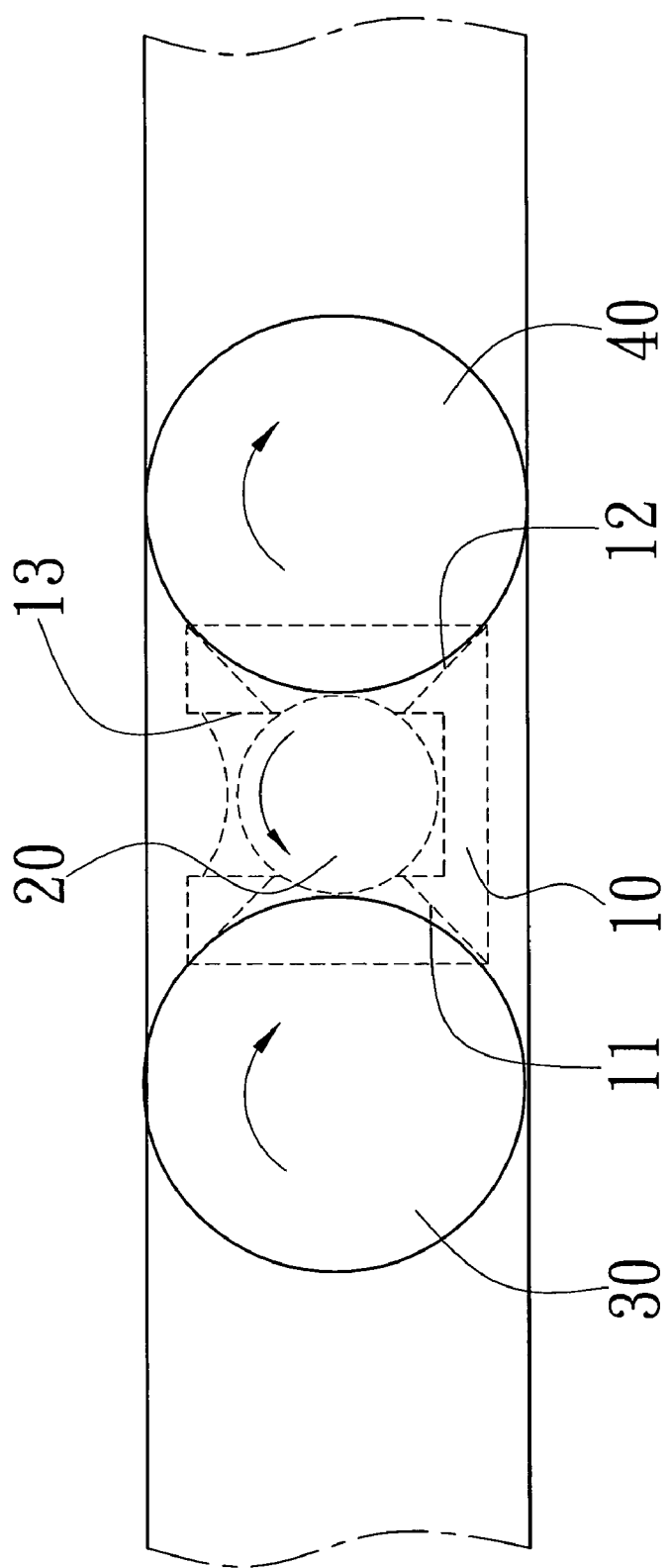
FIG. 5 is a combined assembly view of a partition room, a spacer ball and two load carrying balls in a ball screw unit.

Referring to FIG. 1 through FIG. 5, a partition room 10 for accommodating a spacer ball 20 is an essential structure of the present invention. The spacer ball 20 in the partition room 10 maintains a rotational contact with load carrying balls 30, 40 at its two sides.

The partition room 10 is made of a polymer or other elastic material formed into a cylindrical shape with a diameter slightly less than that of the load carrying balls 30 and 40 so as to avoid contacting either the bolt or nut of the ball screw unit. The partition room 10 is formed into two oblique frustum shaped recesses 11, 12 each of them extending its flared mouth tilted downwardly to the longitudinal axis of the ball screw unit to couple with the load carrying ball 30 or 40. The distance between two vertexes of the recesses 11, 12 is slightly less than the diameter of the spacer ball 20. A hole 13 communicating with both recesses 11, 12 is opened through the body of the partition room 10 with its center aligned to the center of the line connecting the vertexes of the recesses 11 and 12 for filling the spacer ball 20. The filling hole 13 is formed into approximately an oblate ellipsoid with its major axis (hole length) slightly longer than the diameter of the spacer ball 20, while the minor axis (hole width) thereof slightly shorter. The diameter of opening 111, 121 between the recesses 11, 12 and the filling hole 13 is made slightly smaller than that of the spacer ball 20. With this structure, the spacer ball 20 can be pushed into the hole 13 of the partition room 10 by the resiliency of the partition material without the worry of accidental bouncing out during operation of the ball screw unit. The spacer ball 20 is able to keep good rotational contact with the load carrying balls 30 and 40 via the openings 111 and 121.

With such a dexterous structural design of the partition room 10, the spacer ball 20 can be pushed into the filling hole 13 prepared in the partition room 10 by the resiliency of the partition material so as to be settled properly in the filling hole 13. As the width (minor axis) of the filling hole 13 is shorter than the diameter of the spacer ball 20, it is reliably confined in the filling hole 13 between the recesses 11, 12 without the worry of excursing our of its position even during heavy operation of the ball screw unit, but instead, as the length (major axis) of the filling hole 13 is being made longer than the diameter of the spacer ball 20, it can freely rotate in its position and make a good rotational contact with the load carrying balls 30 and 40 via the openings 111 and 121. In all, the spacer ball 20 serves as an intermediate medium of power transmission for the load carrying balls 30 and 40 without occurrence of ball squeezing even the spacer ball 20 is made as small as possible so as to increase the number of load carrying balls 30, 40 thereby improving the load carrying capability of the ball screw unit. The noteworthy advantages of the present invention are concluded as follows:

1. The resiliency of partition material facilitates pushing the spacer ball into the filling hole.

2. The narrower width of the partition room than the diameter of the spacer ball helps confine the spacer ball in the filling hole without the fear of escaping from it.

3. The larger length of the filling hole than the diameter of the spacer ball causes it able to rotate freely and keep good rotational contact with the adjacent load carrying balls via the openings of the two side recesses.

It is understood that the present invention is a high level technical creation and by no means, simply utilizes conventional technology or knowledge known prior to the application for patent, or can easily made by persons skilled in the arts. The invention has neither been published or put to public use, nor displayed in an exhibition. Therefore the present invention is entitled for patent application.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What the claimed is:

1. A partition room essentially made of an elastic material for setting a spacer ball of a ball screw unit for making rotational contact with two load carrying balls at two sides thereof, wherein said partition room is formed into two recesses to couple with the spherical surfaces of the adjacent load carrying balls, a hole communicating with said two recesses is opened through said partition room with its center aligned to the center of the line connecting the vertexes of said two recesses for filling said spacer ball into it, two openings of said hole communicating with said recesses have a diameter smaller than that of said spacer ball so that said spacer ball is able to make rotational contact with two adjacent load carrying balls to help them roll smoothly, wherein said hole for filling with said spacer ball is formed into an oblate ellipsoid with its major axis (length of the hole) being longer than the diameter of said spacer ball, while the minor axis (width of the hole) thereof is shorter.

2. The partition room of claim 1, wherein said spacer ball is retained in the filling hole by the resiliency of the partition material and set in said partition room between said two openings to be able to rotate freely.

3. The partition room of claim 1, wherein said two recesses are two oblique frustum shaped cavities formed in said partition room each of them extending its flared mouth from the center of said partition room tilted downwards to the longitudinal axis of the ball screw unit.

* * * * *